Figure 1:
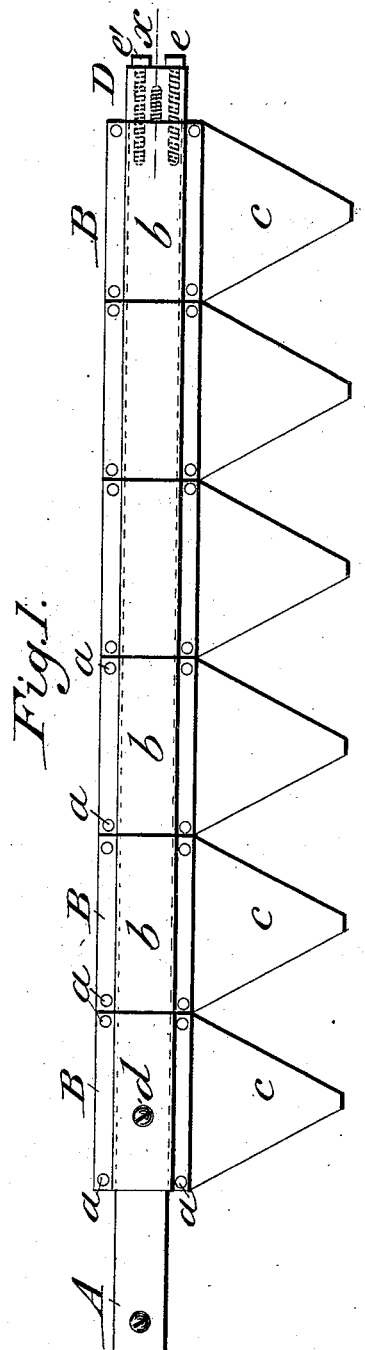

(No Model.) 2 Sheets—Sheet 1.

C. E. MORTON & S. F. BROWN.
CUTTER AND CUTTER BAR FOR MOWERS AND REAPERS.

No. 377,464. Patented Feb. 7, 1888.

Witnesses
F. H. Schott
G. Burroughs.

Inventor
C. E. Morton,
& S. F. Brown,
By his Attorney
W. C. Langan.

(No Model.) 2 Sheets—Sheet 2.
C. E. MORTON & S. F. BROWN.
CUTTER AND CUTTER BAR FOR MOWERS AND REAPERS.
No. 377,464. Patented Feb. 7, 1888.
Fig. 4.
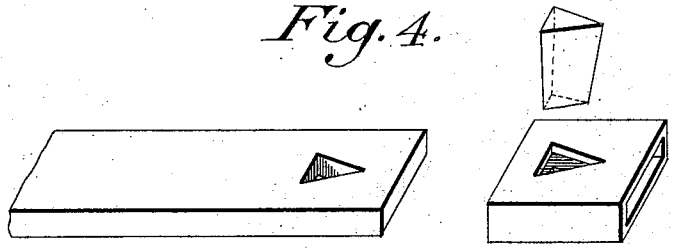
Fig. 5. Fig. 6.
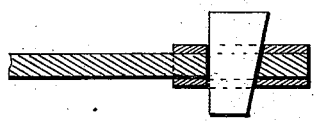 
Fig. 7.
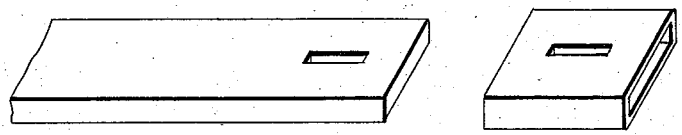
Fig. 8.
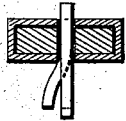
Witnesses
F. H. Schott
F. W. Burroughs
Inventor
C. E. Morton
& S. F. Brown
By his Attorney
W. C. Langan

UNITED STATES PATENT OFFICE.

CHARLES EVERETT MORTON AND SIDNEY FRANKLIN BROWN, OF MADISON-VILLE, KENTUCKY.

CUTTER AND CUTTER-BAR FOR MOWERS AND REAPERS.

SPECIFICATION forming part of Letters Patent No. 377,464, dated February 7, 1888.

Application filed October 4, 1887. Serial No. 251,470. (No model.)

*To all whom it may concern:*

Be it known that we, CHARLES EVERETT MORTON and SIDNEY FRANKLIN BROWN, citizens of the United States, residing at Madisonville, in the county of Hopkins and State of Kentucky, have invented certain new and useful Improvements in Cutters and Cutter-Bars for Mowers and Reapers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvement in cutters and cutter-bars for mowers and reapers, the object being to so construct them as to avoid the trouble and delay occasioned by the common method of securing the cutters to the bar by screws when it is desired to replace a broken cutter or to remove and again attach them to the bar when taken off for grinding or other purposes; and this object is obtained by making the cutters with a loop, so that they may be slipped onto the bar or removed one after the other, and when all are in place secured by a nut screwed onto a projecting pin at the end of said bar, or by other suitable devices.

Cutters having a loop formed in them by cutting two slits through the same and then bending the central part upward and the side strips down, thus forming an opening through which the bar having a parabolic cross-section could be inserted, have been invented; but these cutters have not come into general use, as it required a specially-constructed bar upon which to place them, and the slitting of the section weakened it to such an extent that after being tempered it was very liable to break at the point where the slits terminated. Cutters have also been made with a loop by bending the plate around a rectangular frame of the same cross-section as an ordinary cutter-bar, thus forming a loop by means of which they could be slipped onto the bar one after the other in the same manner as those made by us.

In constructing the cutters according to our invention we form the same of a plate of the best steel applicable to such purposes, which, after being cut to form, is pierced with a suitable number of rivet-holes, ground, and tempered. A loop formed from a lower grade of steel-plate, which may be readily bent into the desired shape without danger of cracking during the operation, is then securely riveted to one side of the cutter, leaving a rectangular opening of the size of the ordinary cutter-bar, so that the cutters may be slipped onto the bar one after the other, and when a sufficient number are in place they are securely retained in position by a nut or collar at the outer end of the bar. By this method of construction we are enabled to use the best steel for the cutters, which could not be done safely if we were compelled to make one or more right-angled bends in the plate in order to form the loop.

Figure 2:
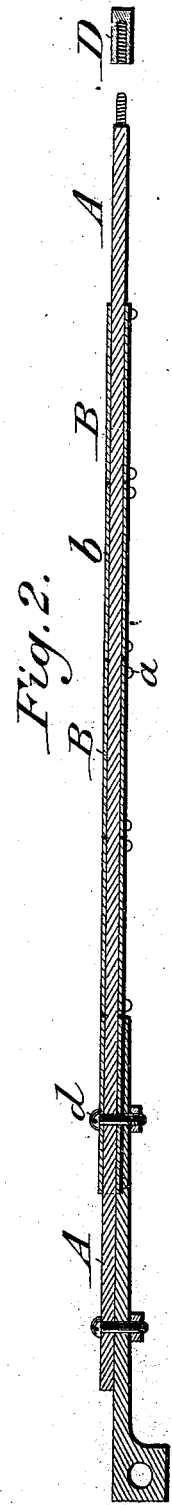
Figure 3:
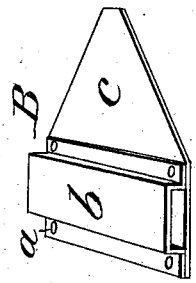

In the accompanying drawings, which illustrate our invention, Figure 1 is a plan of a cutter-bar provided with cutters constructed in accordance with the requirements of our invention. Fig. 2 is a longitudinal section through the same on line $x$ $x$, showing the manner in which the cutters are secured to the bar. Fig. 3 is a perspective view of one of the cutters removed from the bar. Figs. 4, 5, 6, 7, and 8 show various forms of devices which may be employed to retain the cutters upon the end of the cutter-bar.

In the several figures, A represents the cutter-bar, and B B the cutters secured upon said bar. Each of these cutters consists of a blade, $c$, formed from a plane piece of steel-plate cut to the shape of the ordinary cutter and pierced with the rivet-holes for the reception of rivets $a$ $a$. This plate, after receiving its shape, is tempered and ground in the same manner as the cutters in common use. They are then ready to receive the loop $b$, which is made from a rectangular plate of steel or iron bent into such a shape as to inclose three sides of the bar A, the fourth side being covered by the cutter $c$. This loop is also pierced with holes registering with the holes in the plate $c$, to receive the rivets by means of which the loop is firmly secured to said plate. This completes the construction of the cutters, which are then ready to be applied to the bar A in the following manner: The first one is slipped on the bar and moved thereon until it reaches the desired position for the inner cutters, and is there retained by a screw-bolt, d, passing through the cutter and bar; or a projection may be formed on said bar, against which the first cutter will abut. Additional cutters are then slipped onto the bar one after the other until the bar is full, when the last one, and consequently those which have preceded it, is secured in place by a nut, D. To prevent this nut D from unscrewing and allowing the cutter to slip off the bar when the machine is in use, two screws, e and e', one having a right and the other a left hand thread, are inserted through the nut into the end of this bar, thus effectually preventing said nut from becoming accidentally unscrewed. Jam-nuts of the ordinary construction might be used in place of the nut D and its securing-screws; but the latter is preferred, as making a better finish for the end of the bar, as well as being more secure.

Figs. 4, 5, 6, 7, and 8 show modifications of the means used for holding the cutters on the bar, consisting of a collar so formed as to slip over the end of the bar and perforated at top and bottom by a mortise, preferably triangular in section. The end of the bar is similarly perforated, so that when the collar is placed thereon a key may be inserted in the mortise and driven until the cutters are brought to bear firmly against each other. The projecting ends of the key are then cut off, leaving sufficient to rivet down upon each side, thus firmly securing the collar on the end of the bar.

Having thus described our invention, we claim as new, and desire to secure by Letters Patent, the following:

1. As an improvement in cutters for reapers and mowers, the straight unbent plate c, in combination with the cap b, bent to inclose three sides of the cutter-bar, and riveted to said straight plate to form a loop for the reception of the cutter-bar, substantially as set forth.

2. As an improvement in cutters and cutter-bars, the cutter formed of a straight plate with a cap forming a loop riveted thereto, in combination with the bar and the nut screwed upon the end of the same, with right and left screws passing through said nut into the end of the bar to prevent its accidental removal, as set forth.

In testimony whereof we affix our signatures in presence of two witnesses.

CHARLES EVERETT MORTON.
SIDNEY FRANKLIN BROWN.

Witnesses:
JOHN G. MORTON,
C. H. SLATON.